Oct. 18, 1932.   P. GILGENBERG   1,883,690
DEVICE FOR WITHDRAWING LOW PRESSURE GASES FROM HIGH PRESSURE VESSELS
Filed Oct. 27, 1930
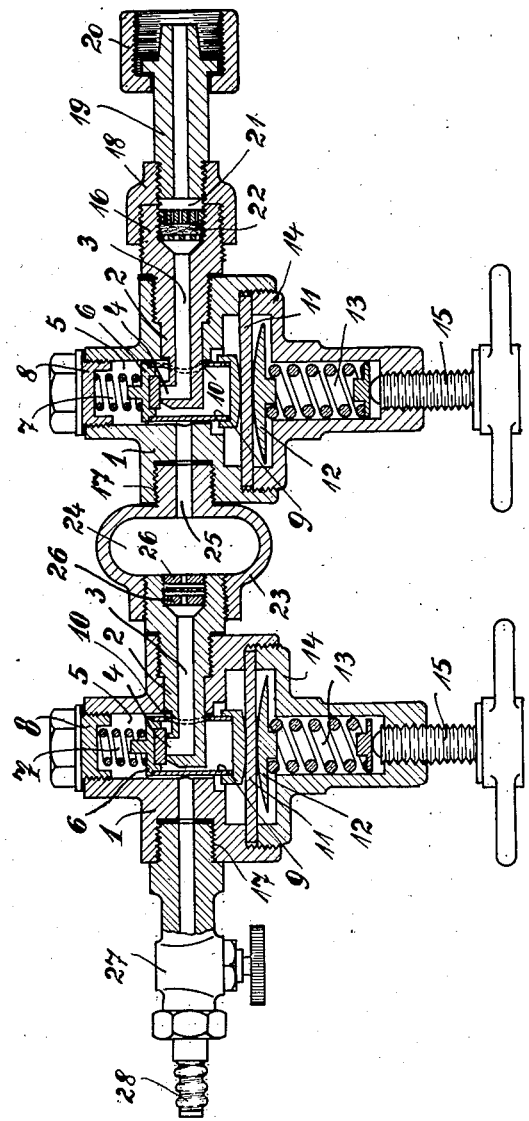
Paul Gilgenberg
by Patented Oct. 18, 1932

1,883,690

UNITED STATES PATENT OFFICE

PAUL GILGENBERG, OF COLOGNE-ON-THE-RHINE, GERMANY

DEVICE FOR WITHDRAWING LOW PRESSURE GASES FROM HIGH PRESSURE VESSELS

Application filed October 27, 1930. Serial No. 491,626, and in Germany February 25, 1930.

More particularly the invention is concerned with pressure reducing devices for gases taken from high pressure cylinders for welding burners and other purposes, the relieving of the pressure not being brought about by a simple pressure reducing valve, but by interposing an intermediate pressure stage by means of two pressure reducing valves arranged in succession in order to give greater certainty and uniformity of the working pressure of the gas even under fluctuating consumption.

With the gas withdrawal devices known hitherto, there occur not infrequently and particularly when using large burners for welding, more or less rapid periodic fluctuations of the working pressure, this making the welding operation difficult, if not impossible. Alternate oscillations of the valves of the relieving devices easily take place, when the two pressure reducing valves relieving the pressure have identical construction, as is desirable in the interests of simplicity of manufacture, erection and operation of such relieving devices.

According to the present invention, it is possible to preclude these disturbances of working completely by interposing a large receiving chamber between the two pressure reducing valves and arranging a throttling passage on the other side of this chamber. Consequently the action of sudden changes of pressure in the intermediate stage from one valve to the other is checked, so that such changes can exert no influence on the two valves in the way of producing alternating oscillatory movements.

The invention will be better understood by referring to the accompanying drawing which shows a longitudinal section of a gas withdrawal device constructed according to the invention.

The device comprises in the main, two reducing or relieving valves which are arranged in succession and are of identical construction so that they may be interchanged. In a transverse aperture opening to one side, the casing 1 of each of these relieving valves contains the valve seating member 2, provided with a longitudinal passage 3 running into the valve opening 4, arranged at right angles thereto, This end portion of the valve seating member protrudes laterally into the valve chamber which is formed by a longitudinal boring 5 of the casing and in which the valve disc 6 is so arranged, opposite the valve opening 4, that it is urged on to the valve seating surrounding the opening 4 by means of a loading spring 7 which thrusts against a screwed plug 8 sealing off the longitudinal boring 5.

The valve disc 6 is rigidly connected at its seating surface to a supporting bush 9 provided with a window opening 10 which, with sufficient freedom of movement, fits around the neck of the end portion of the valve seating member 2 protruding into the longitudinal boring 5. The bottom portion of this supporting bush is in contact with a diaphragm 11, of flexible material such as leather or the like and, through the medium of a pressure shoe 12, the outside of this diaphragm is acted upon by the spring 13. A cover 14 serves to clamp the edge of the diaphragm 11 and also to guide the relief sprin 13, the outer end of which thrusts against the inner end of a pressure screw 15, the regulation of which enables the relief spring to be adjusted as desired.

For the purpose of connecting up to the adjoining parts, the end of the valve seating member 2, protrudes from the body and is provided with a screwed union piece 16, whilst at the opposite side of the body a connecting socket 17 is arranged for this purpose.

The union piece 16 of one of the two relief valves is connected by a reducing socket 18 to one end of a tubular piece 19, which by means of screw cap 20 may be connected in well-known manner to the shut-off valve of a high pressure gas cylinder. A filter 22 is preferably arranged before the pressure reducing valve in a cavity 21 of the union piece 16 of the valve seating member.

Between the two relieving valves there is provided an intermediate member 23 screwed by means of a suitable nipple into the socket 17 of the casing of the first pressure reducing valve whilst the other internally screwed end is joined to the union piece 16 of the second pressure reducing valve. The intermediate member 23 contains an enlarged space or cavity 24 which is associated with the low pressure side of the valve chamber 5, through its in-take passage 25. In the cavity 21 forming the entry to the longitudinal passage 3 of the second valve, a number of throttling plates or flow restrictors 26 are inserted. These are spaced apart from each other and are provided with mutually staggered orifices which are smaller than the longitudinal boring 3.

The delivery pipe from which the welding burner or other apparatus is supplied is connected to the low pressure side of the valve space 4 of the second relief valve, for example through a shut-off cock 27 screwed into the socket 17 and a tubing nipple 28.

When the working pressure suddenly drops, as may follow an increase in pressure due to a blow back in the burner pipe, so that, owing to the release of pressure at the inside of the diaphragm 11, the tension of the relief spring 13 acquires a considerable preponderance over the loading spring 7 and consequently the valve disc 6 opens too much, the excessive reduction of pressure in the connecting passage caused thereby can only act unrestrained up to the throttling point formed by the discs 26, whilst the pressure in the intermediate chamber 24 falls considerably slower.

Consequently the effect of the sudden change of pressure comes into operation on the first pressure reducing valve so slowly that sudden violent opening of the valve disc of the first valve is avoided and the alternate oscillation of the two valves is checked.

Should the first valve be opened too much, the released excess of gas is sufficiently obsorbed by the chamber 24 in co-operation with the throttling passage, so that a sudden opening effect from the medium pressure side on the second relief valve is avoided.

Having now particularly described and ascertained the nature of my said invention, and in what manner the same is to be performed, I declare that what I claim is:—

1. The combination with a pair of identical pressure regulating valves each having a central chamber and relatively small inlet and outlet openings, of a connection between the outlet of one valve and the inlet of the other, said connection including a large expansion chamber provided with inlet and outlet passages, and a throttling device located in the outlet passage from the expansion chamber.

2. The combination with a pair of identical pressure regulating valves each having a central chamber and relatively small inlet and outlet openings, of a connection between the outlet of one valve and the inlet of the other, said connection including a large expansion chamber provided with inlet and outlet passages, said outlet passage having its end adjacent the large expansion chamber enlarged to form a throttling chamber, and flow restrictor plates arranged across said throttling chamber to throttle the gas escaping from the expansion chamber.

In testimony whereof I affix my signature.
PAUL GILGENBERG.